United States Patent
Wall et al.

(10) Patent No.: US 12,111,390 B2
(45) Date of Patent: Oct. 8, 2024

(54) DUAL PULSED MODE FMCW RADAR RETROFIT CONVERSION WITH ADAPTIVE SWEEP CONFIGURATION

(71) Applicant: The Boeing Company, Chicago, IL (US)

(72) Inventors: Walter S. Wall, Calabasas, CA (US); Jonathan J. Lynch, Oxnard, CA (US); James D. Krieger, Woodland Hills, CA (US); Evan A Schlomann, Santa Monica, CA (US)

(73) Assignee: The Boeing Company, Arlington, VA (US)

( * ) Notice: Subject to any disclaimer, the term of this patent is extended or adjusted under 35 U.S.C. 154(b) by 609 days.

(21) Appl. No.: 17/368,875

(22) Filed: Jul. 7, 2021

(65) Prior Publication Data

US 2023/0010398 A1 Jan. 12, 2023

(51) Int. Cl.
*G01S 13/87* (2006.01)
*G01S 7/03* (2006.01)
*G01S 13/10* (2006.01)
*G01S 13/34* (2006.01)

(52) U.S. Cl.
CPC ............ *G01S 13/87* (2013.01); *G01S 7/03* (2013.01); *G01S 13/103* (2013.01); *G01S 13/343* (2013.01)

(58) Field of Classification Search
None
See application file for complete search history.

(56) References Cited

U.S. PATENT DOCUMENTS

| | | |
|---|---|---|
| 9,128,189 B1 * | 9/2015 | West .................... G01S 7/03 |
| 9,194,946 B1 | 11/2015 | Vacanti |
| 9,618,605 B2 | 4/2017 | Johnson et al. |
| 10,324,166 B2 | 6/2019 | West et al. |
| 2009/0121926 A1 | 5/2009 | Iverson |
| 2013/0169468 A1 | 7/2013 | Johnson et al. |
| 2015/0285897 A1 | 10/2015 | Kilty et al. |
| 2016/0291144 A1 * | 10/2016 | Chang .................... G01S 7/03 |
| 2018/0321368 A1 | 11/2018 | Bharadwaj et al. |
| 2022/0413090 A1 * | 12/2022 | Harkins ............... G01S 7/027 |

OTHER PUBLICATIONS

Raytheon Radar Install (Year: 2005).*
Furno Radar Installation Manual (Year: 2018).*

* cited by examiner

*Primary Examiner* — Whitney Moore
(74) *Attorney, Agent, or Firm* — Ostrager Chang Flaherty & Broitman P.C.

(57) ABSTRACT

A retrofit system applied to existing FMCW radars in order to convert them into pulsed linear frequency-modulated radars with the ability to dynamically switch between two pulsed modes and an FMCW mode based on the estimated range of a target. This retrofit also includes provisions for adaptively configuring chirp and sweep parameters to optimize range resolution. The result is a retrofit system capable of converting an FMCW radar into a dual pulsed mode radar with adaptive sweep configuration.

20 Claims, 9 Drawing Sheets

FIG. 9

DUAL PULSED MODE FMCW RADAR RETROFIT CONVERSION WITH ADAPTIVE SWEEP CONFIGURATION

BACKGROUND

The technology disclosed herein generally relates to radar systems that operate at both near and far ranges and, in particular, relates to radar systems which are capable of operating in either a frequency modulation continuous wave (FMCW) mode (for short ranges) or a pulsed mode (for long ranges).

Both pulsed and FMCW radars are well known. FMCW radars which are typically used for short-range sensing applications are currently being produced in high volumes for automotive and autonomy applications enabling very low unit costs. On the other hand, pulsed radars are better suited for long-range applications but are not currently produced in large volumes, requiring expensive engineering costs to design them anew for each specific application.

Some radar systems are able to operate in both FMCW and pulsed modes to achieve the benefits of FMCW operation at short range and pulsed mode operation at long range. In some situations, it would be advantageous to convert an existing low-cost FMCW radar system into a pulsed radar system.

SUMMARY

The subject matter disclosed in some detail below is a retrofit system applied to existing FMCW radars in order to convert them into pulsed linear frequency-modulated radars with the ability to dynamically switch between two pulsed modes and an FMCW mode based on the estimated range of a target. This retrofit also includes provisions for adaptively configuring chirp and sweep parameters to optimize range resolution. The result is a retrofit system capable of converting an FMCW radar into a dual pulsed mode radar with adaptive sweep configuration.

By converting a low-cost commercial off-the-shelf (COTS) FMCW radar into a pulsed radar system rather than designing and fabricating the pulse radar system anew, the non-recurring engineering costs associated with customized radio frequency (RF) monolithic microwave integrated circuit (MMIC) design can be avoided, dramatically reducing the cost of the pulsed radar system. The retrofit method involves attaching external hardware to an existing low-cost FMCW radar. In particular, the addition of both transmit and receive switches allows high-power external amplifiers to be used to extend the range of the FMCW radar system without damaging the sensitive receivers of the FMCW radar system. Further, the addition of these switches as external components to the core FMCW radar enables the system to operate in three distinct modes: one FMCW mode and two pulsed modes.

Although pulsed linear frequency-modulated radar systems having the capability to dynamically switch between two pulsed modes and an FMCW mode based on the estimated range of a target will be described in some detail below, one or more of those embodiments may be characterized by one or more of the following aspects.

One aspect of the subject matter disclosed in some detail below is a method of retrofitting an FMCW radar system, the method comprising: (a) disconnecting an antenna from the FMCW radar system; (b) connecting a retrofit transmit/receive module to the FMCW radar system; and (c) connecting the antenna to the retrofit transmit/receive module.

In accordance with various embodiments, step (b) comprises the following steps performed in any order: connecting a transmit switch in a transmit channel of the retrofit transmit/receive module to a transmitter of the FMCW radar system; connecting the transmit switch to a microcontroller of the FMCW radar system; connecting receive switches in a receive channel of the retrofit transmit/receive module to a receiver of the FMCW radar system; connecting the receive switches to the microcontroller; connecting a variable attenuator in the transmit channel to the microcontroller; and connecting variable attenuators in the receive channel to the microcontroller.

Another aspect of the subject matter disclosed in some detail below is a radar system comprising a FMCW radar system, a retrofit transmit/receive module connected to the FMCW radar system, and an antenna connected to the retrofit transmit/receive module. The FMCW radar system comprises a transmitter, a receiver connected to the transmitter, analog-to-digital converters connected to the receiver, a digital signal processor connected to the analog-to-digital converters, and a microcontroller connected to the digital signal processor and to the transmitter. The retrofit transmit/receive module comprises a transmit channel and a receive channel. The transmit channel comprises a transmit switch that is connected to the transmitter and to the microcontroller. The receive channel comprises a receive switch that is connected to the receiver and to the microcontroller. The microcontroller is configured to control switching states of the transmit and receive switches to enable selective operation in an FMCW mode or in either of a pulsed search mode or pulsed tracking mode.

A further aspect of the subject matter disclosed in some detail below is a method for operating a radar system, the method comprising: controlling a local oscillator to output linear frequency-modulated sweep signals, controlling switching states of transmit and receive switches, and controlling attenuation levels of variable attenuators so that the radar system operates in a pulsed search mode during a first time period; controlling the local oscillator to output linear frequency-modulated sweep signals, controlling the switching states of the transmit and receive switches, and controlling the attenuation levels of the variable attenuators so that the radar system operates in a pulsed tracking mode during a second time period subsequent to the first time period; and controlling the local oscillator to output linear frequency-modulated sweep signals, controlling the switching states of the transmit and receive switches, and controlling the attenuation levels of the variable attenuators so that the radar system operates in an FMCW mode during a third time period subsequent to the first time period, wherein the radar system is capable of detecting targets at long range when operating in the pulsed search mode, detecting targets at mid-range when operating in the pulsed tracking mode, and detecting targets at short range when operating in the FMCW mode.

Other aspects of pulsed linear frequency-modulated radar systems having the capability to dynamically switch between two pulsed modes and an FMCW mode based on the estimated range of a target are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects.

Reference will hereinafter be made to the drawings in which similar elements in different drawings bear the same reference numerals.

DETAILED DESCRIPTION

Illustrative embodiments of pulsed linear frequency-modulated radar systems having the capability to dynamically switch between two pulsed modes and an FMCW mode based on the estimated range of a target are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Radar signals typically fall into two categories: pulsed signals and continuous signals. Pulsed signals are on for a short period of time and then turn off and wait for a returned echo. In contrast, FMCW radar typically uses a frequency-modulated continuous signal that bounces off the targets continuously and returns to the receiver. In particular, a linear frequency-modulated sweep signal (the frequency of which increases or decreases with time) is usually applied and the returned signal can be mixed with the transmitted signal to produce a single expected tone for each target return. This linear frequency-modulated sweep signal is also called a linear chirp or linear frequency-modulated signal. There are a number of advantages to using FMCW radar in comparison to pulsed radar.

Figure 1:
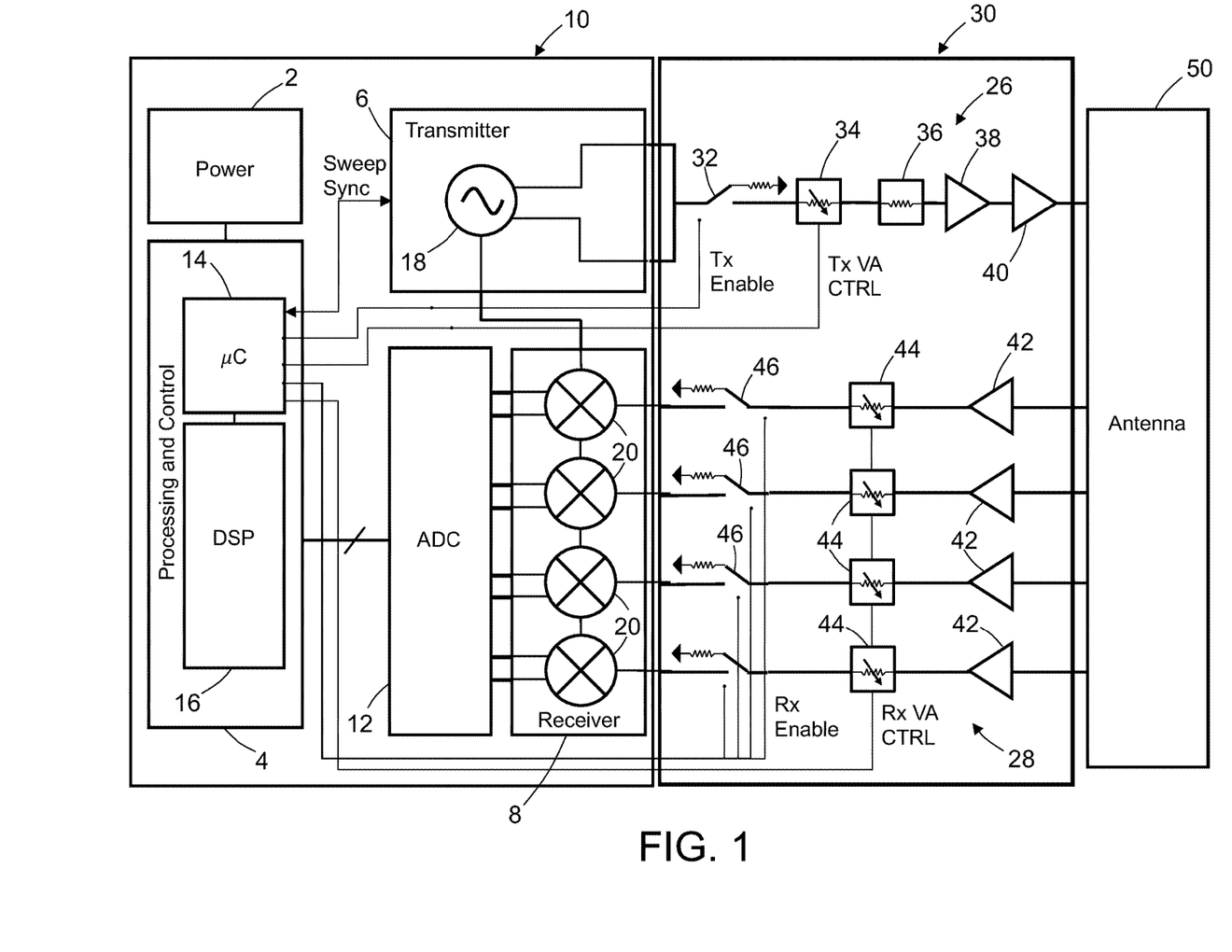
FIG. 1 is a block diagram identifying components of a COTS FMCW radar system with retrofit components added to enable dual pulsed mode operation.

FIG. 1 is a block diagram identifying some components of a FMCW radar system 10 that has been disconnected from an antenna 50 and then connected to a retrofit transmit/receive module 30 to enable dual pulsed mode operation in addition to FMCW mode operation. (As used herein, the term "connected", when used in the context of electrical circuits, means connected by electrical conductors capable of carrying electrical signals when the electrical circuits are energized.) The antenna 50 is connected to the retrofit transmit/receive module 30 before or after retrofit transmit/receive module 30 is connected to FMCW radar system 10. Thus, the retrofit transmit/receive module 30 is installed between FMCW radar system 10 and antenna 50.

In accordance with some embodiments, the antenna 50 is mounted to a two-axis positioning system (e.g., a gimbal) used to orient the antenna 50. In alternative embodiments, the antenna 50 may be a phased array antenna that includes an array of antenna elements and a corresponding array of phase shifters. In a phased array antenna, the feed current for each antenna element passes through a respective phase shifter controlled by a beam steering controller. The beam steering controller is computer configured (e.g., programmed) to control the phase shifters in a manner such that the antenna elements emit respective RF waves that combine to produce a transmit beam having elevation and azimuth angles.

In the embodiment depicted in FIG. 1, the retrofit transmit/receive module 30 includes a transmit channel 26 and a plurality of receive channels 28. The FMCW radar system 10 includes a transmitter 6 that is connected to the transmit channel 26 and a receiver 8 that is connected to the receive channels 28. The receiver 8 has a plurality of mixers 20 connected to respective input ports. The FMCW radar system 10 further includes a plurality of analog-to-digital converters 12 (hereinafter "ADCs 12") having inputs respectively connected to outputs of receiver 8. The transmitter 6 of FMCW radar system 10 includes a local oscillator (LO) 18. The local oscillator 18 is configured to output linear frequency-modulated signals to transmit channel 26 of the retrofit transmit/receive module 30 and to mixers 20 inside receiver 8 of FMCW radar system 10.

The FMCW radar system 10 further includes a power supply 2 and a processing and control board 4 that receives power from power supply 2. The local oscillator 18 also receives power from power supply 2. The processing and control board 4 includes a microcontroller 14 and a digital signal processor 16 (hereinafter "DSP 16"). The microcontroller 14 is connected and configured to control the sweeping of the local oscillator 18 in accordance with parameters of a selected mode of operation. The microcontroller 14 is also connected and configured to control the states of various components of the retrofit transmit/receive module 30 in accordance with timing parameters of the selected mode. The DSP 16 is connected to receive digital radar signals from the ADCs 12. The DSP 16 is configured to detect and estimate the range of potential targets in the scene. Any detected targets are reported to the microcontroller 14, along with the estimated target range if known. The microcontroller 14 is configured to start in a search mode and then transition to either a tracking mode or an FMCW mode in dependence on the estimated target range acquired in the search mode.

Still referring to FIG. 1, the retrofit transmit/receive module 30 include components of a transmit channel 26 and components of a plurality of receive channels 28. The transmit channel 26 operates under the control of microcontroller 14 to convert oscillator signals generated by local oscillator 18 into suitably conditioned signals for driving the antenna elements. Each receive channel 28 operates under the control of microcontroller 14 to condition received signals to protect against large signal voltage swings and to set the signal level correctly for the rest of the signal channel (and ultimately to set the signal level within the ADC's voltage range).

The transmit channel 26 includes the following components connected in series: a transmit switch 32 that is connected to local oscillator 18 of FMCW radar system 10; a variable attenuator 34 that is connected to transmit switch 32; a fixed attenuator 36 that is connected to variable attenuator 34; a driver amplifier 38 that is connected to fixed attenuator 36; and a power amplifier 40 that has an input connected to driver amplifier 38 and an output connected to antenna 50. The transmit switch 32 closes in response to a transmit enable signal (Tx Enable in FIG. 1) received from the microcontroller 14. The attenuation level of the variable attenuator 34 is set by a transmit variable attenuator control signal (Tx VA CTRL in FIG. 1) received from the microcontroller 14.

Each receive channel 28 includes the following components connected in series: a low-noise amplifier 42 connected to antenna 50; a variable attenuator 44 that is connected to low-noise amplifier 42; and a receive switch 46 that has one terminal connected to variable attenuator 44 and the other terminal connected to the receiver 8 of FMCW radar system 10. The receive switch 46 closes in response to a receive enable signal (Rx Enable in FIG. 1) received from the microcontroller 14. The attenuation level of the variable attenuator 44 is set by a receive variable attenuator control signal (Rx VA CTRL in FIG. 1) received from the microcontroller 14.

The embodiment depicted in FIG. 1 may be varied by including one or more transmit switches 32 which are directly connected to each transmit channel 26 or the summation of multiple transmit channels of FMCW radar system 10. The outputs of the transmit switches 32 are then optionally connected to one or a series of amplifiers (e.g., driver amplifier 38 and power amplifier 40), intended to increase the output power of the FMCW radar system 10, and finally to the antenna 50.

The one or more input ports of receiver 8 of FMCW radar system 10 are each connected to a respective receive switch 46. In the embodiment depicted in FIG. 1, the switching states of the receive switches 46 are controlled by an embedded microcontroller 14 synchronized to the pulse sequence of the FMCW radar system 10. In alternative embodiments, the microcontroller controlling the switching states of the receive switches 46 may be disposed external to FMCW radar system 10. This synchronization can be achieved by: (1) utilizing a trigger signal provided by the FMCW radar system 10 to the microcontroller 14; (2) utilizing a trigger signal provided by the microcontroller 14 to the FMCW radar system 10; or (3) detecting the signal transmitted by the FMCW radar system 10 and supplying that as a trigger signal to the microcontroller 14. Some FMCW radar systems have embedded microcontrollers and digital signal processing units, whereas others do not. In the case of the former, the embedded processing capability of the radar can be leveraged where applicable to perform radar management and signal processing functions and in the case of the latter an external microprocessor and an external digital signal processing unit may be provided.

Figure 2:
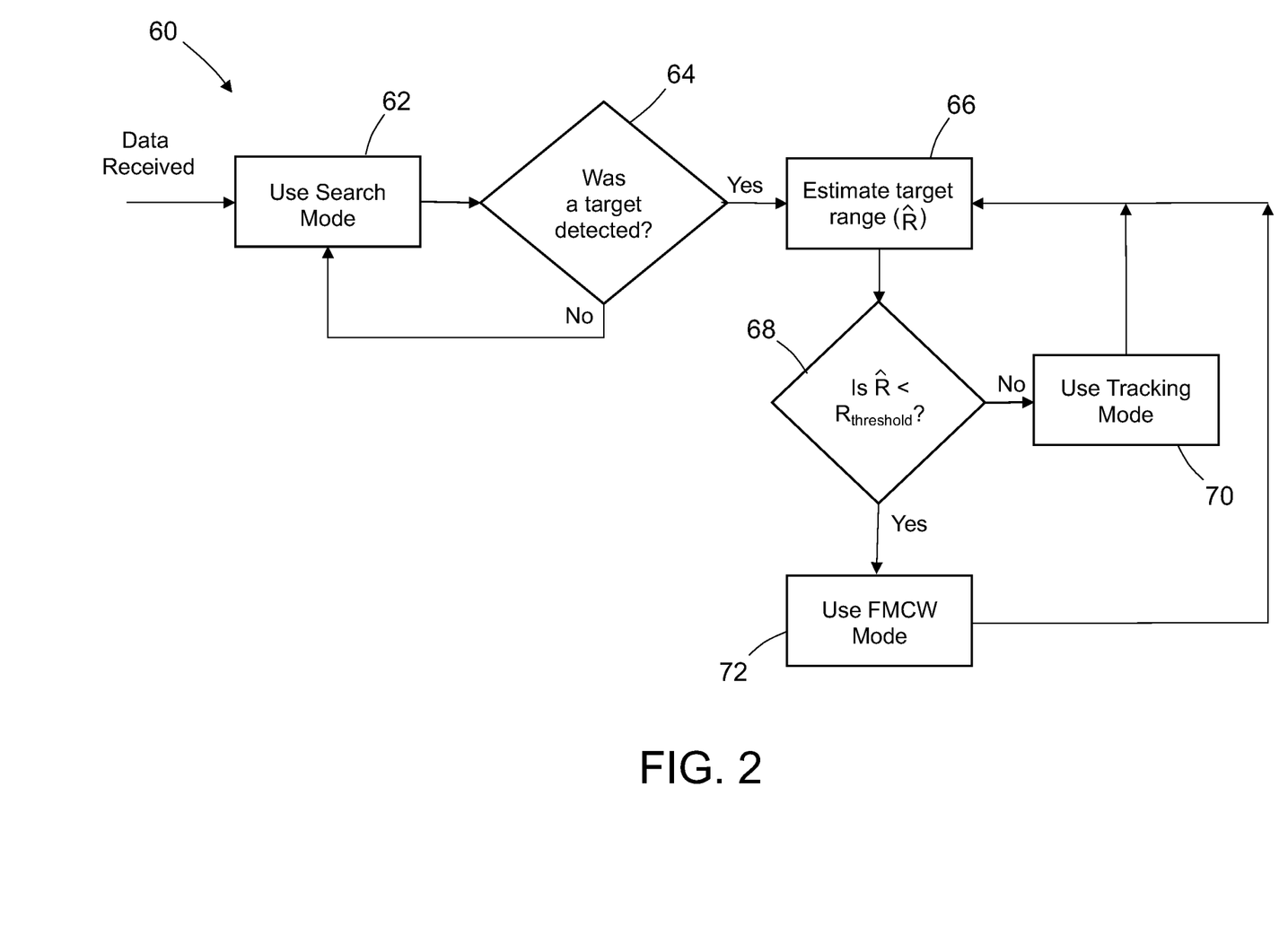
FIG. 2 is a flowchart showing the mode selection logic in accordance with one embodiment.

FIG. 2 is a flowchart showing the mode selection logic 60 governing mode selection by microcontroller 14 in accordance with one embodiment. The mode selection logic 60 is configured so that the microcontroller 14 controls the states of the transmit and receive switches in the retrofit transmit/receive module 30 in three distinct modes.

Initially the system operates in a long-range search mode (step 62) wherein the radar sweep is set to a low bandwidth, creating large range bins but also large maximum range. In this configuration, each transmit channel 26 is pulsed using a respective transmit switch 32. This enables high-power amplifiers (e.g., power amplifier 40) to be utilized, significantly increasing range without damaging the sensitive receive electronics. The duty cycle of the transmit switch 32 in the search mode is determined by the minimum desired measurement range. Once the transmit switch 32 is closed, preventing energy from being radiated by the radar, the receive switches 46 in the receive channels 28 are opened for the remainder of the sweep duration and closed at its conclusion. The DSP 16 processes the radar signals by first detecting a target and then calculating an estimated target range $\hat{R}$ to the detected target. The DSP 16 reports each target detection to the microcontroller 14, including digital data representing the estimated target range $\hat{R}$.

The advantage of the search mode is that long ranges can be achieved; however, the resulting range resolution is poor. To alleviate this issue and enable high-resolution target identification and recognition, a second mode is engaged once an initial range estimate is obtained from the search mode.

Referring again to FIG. 2, the microcontroller 14 is configured to continually determine whether a target has been detected or not (step 64). On the one hand, if the microcontroller 14 determines in step 64 that a target was not detected, the microcontroller 14 continues to operate the retrofit transmit/receive module 30 in the search mode (step 62). On the other hand, if the microcontroller 14 determines in step 64 that a target was detected, then the DSP 16 reports the most recently updated estimated target range $\hat{R}$ to microcontroller 14 (step 66) The microcontroller then makes a determination whether the estimated target range $\hat{R}$ is less than a range threshold $R_{threshold}$ or not (step 68).

On the one hand, if a determination is made in step 68 that the estimated target range $\hat{R}$ is not less than the range threshold $R_{threshold}$, then the microcontroller 14 operates the retrofit transmit/receive module 30 in the tracking mode (step 70). While operating the retrofit transmit/receive module 30 in the tracking mode, microcontroller 14 continually receives the most recently updated estimated target range from DSP 16 (step 66) and re-determines in step 68 whether the estimated target range is less than the range threshold. As long as the estimated target range is not less than the range threshold, the microcontroller 14 stays in the tracking mode.

On the other hand, if a determination is made in step 68 that the estimated target range is less than the range threshold, then the micro-controller 14 operates the retrofit transmit/receive module 30 in the FMCW mode (step 72). While operating the retrofit transmit/receive module 30 in the FMCW mode, microcontroller 14 again continually receives the most recently updated estimated target range from DSP 16 (step 66) and re-determines in step 68 whether the estimated target range is less than the range threshold. As long as the estimated target range is less than the range threshold, the microcontroller 14 stays in the FMCW mode.

The tracking mode utilizes a technique known as stretch processing, where a first LO chirp is generated by the radar and used to radiate a signal into free space. The reflected returns from this first LO chirp are mixed with a second LO chirp centered in time at the estimated round trip time from the radar to the target and back. In the system proposed herein, this is implemented by having two distinct and concurrent switch sequences. In the first sequence, the transmit switches 32 are closed but the receive switches 46 are opened, allowing signals to be radiated but not received by the system, thereby preventing high-power signals from damaging sensitive components in the receivers. In the second sequence, the transmit switches 32 are opened and the receive switches 46 are closed, thereby preventing additional signals from being radiated from the radar while allowing the signals transmitted in the first sequence to be received by the system. The durations of these two sequences are determined by the desired range resolution and range extent as well as the estimated range to the target. The advantage of the tracking mode is that since the range extent is limited to a small window around the target, much smaller range resolutions can be achieved, thereby improving target identification and tracking.

The final or terminal mode of operation for the system is a non-pulsed mode (hereinafter "FMCW mode") in which all switches are open and the radar operates as an FMCW system. In the FMCW mode, the gain on the amplifiers is reduced to prevent damage to sensitive front-end components. The FMCW mode is activated once the estimated range of the target is sufficiently low such that the radar can detect the target without operating the external power amplifiers 40 at full power. In accordance with one embodiment, the FMCW range estimation algorithm dechirp the received signal by mixing it with the transmitted signal. Then the beat frequency is extracted from the dechirped signal using any one of a variety of algorithms.

To summarize FIG. 2, the mode selection logic 60 is determined by the estimated range of the target to the radar. This estimate is determined by measuring the baseband radar return over multiple pulses and performing well-known signal processing techniques to estimate both the range and speed of discrete scatterers within a scene. In the event that inertial and/or positional data is available to the radar, multiple pulses can be integrated to improve the signal-to-noise ratio of target returns. If more than one receive channel 28 is available, than the bearing of discrete scatterers can be determined through a variety of well-known techniques such as monopulse tracking algorithms.

Figure 3:
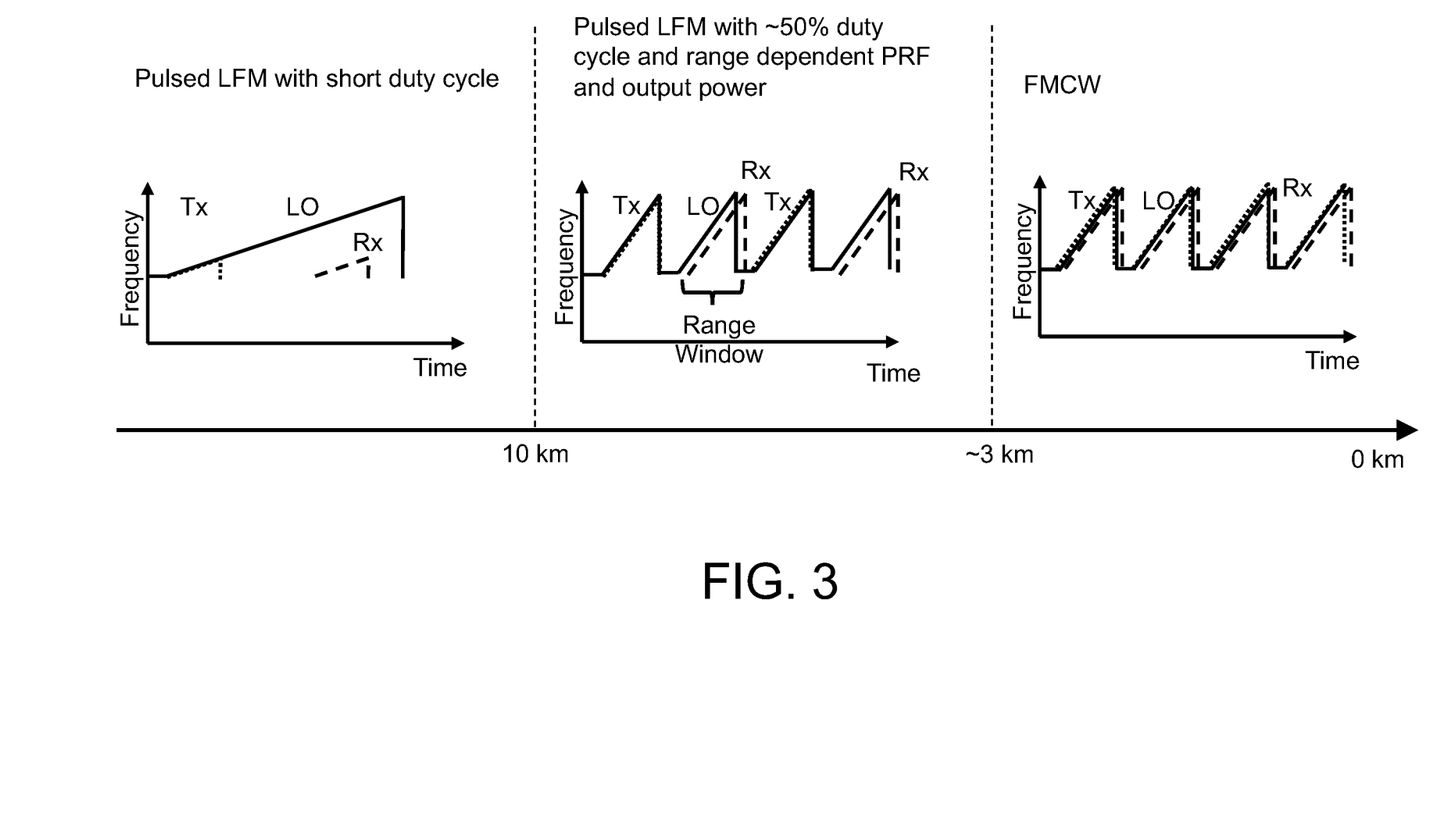
FIG. 3 is a diagram showing frequency versus time graphs for the different modes of operation of the radar system in accordance with one embodiment.

FIG. 3 is a diagram showing the different modes of operation of the radar system in accordance with one embodiment. More specifically, FIG. 3 includes respective frequency versus time graphs for the linear frequency-modulated pulses transmitted and received based on the linear frequency-modulated signals (up chirps) generated by the local oscillator 18 for the search, tracking, and FMCW modes.

The first frequency versus time graph on the left-hand side of FIG. 3 shows a linear frequency-modulated pulse with a short duty cycle used in the search mode. The solid lines represent the up chirp output by the local oscillator 18. The dotted lines represent the portion of the up chirp which is transmitted during the transmit cycle. The dashed lines represent the up chirp which is returned during the receive cycle. At the time when the search mode is initiated, the target range is not known. The search mode is able to cover all ranges greater than a few kilometers (e.g., more than 10 kilometers in the example presented in FIG. 3). The search mode has low range resolution and low angular error.

The second frequency versus time graph in the center of FIG. 3 shows linear frequency-modulated pulses with an ~50% duty cycle and range-dependent pulse repetition frequency (PRF) and output power used in the tracking mode. The solid lines represent the up chirps output by the local oscillator 18. The dotted lines represent the up chirps which are transmitted during successive transmit cycles. The dashed lines represent the up chirps which are returned during successive receive cycles. While the system is being operated in the tracking mode, the approximate target range is known. The tracking mode is able to cover only a limited number of ranges (e.g., from approximately 3 to 10 kilometers in the example presented in FIG. 3). The tracking mode has high range resolution and low angular error.

The third frequency versus time graph on the right-hand side of FIG. 3 shows linear frequency-modulated continuous waves in the FMCW mode. The solid lines represent the up chirp output by the local oscillator 18. The dotted lines represent the portion of the up chirp which is transmitted during the transmit cycle. The dashed lines represent the up chirp which is returned during the receive cycle. While the system is being operated in the FMCW mode, the approximate target range is known. The FMCW mode is able to cover less than a few (e.g., less than approximately 3 kilometers in the example presented in FIG. 3). The FMCW mode has high range resolution and low angular error.

Figure 4:
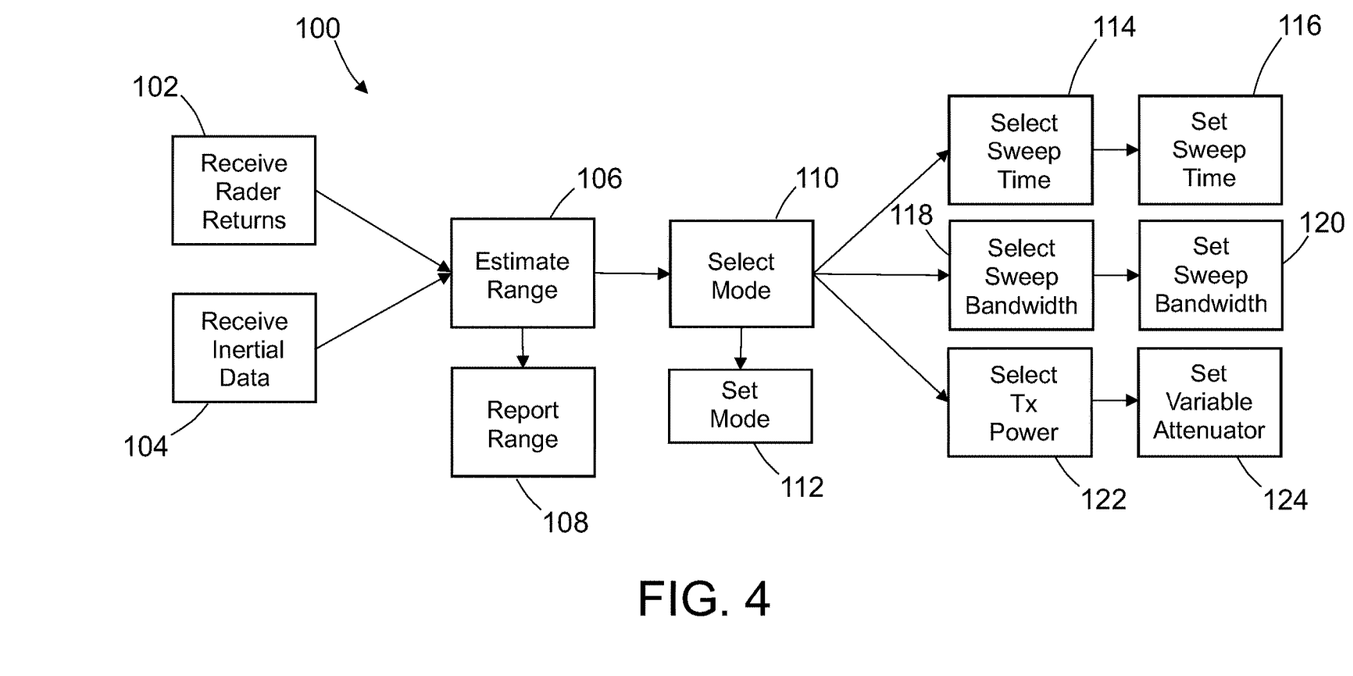
FIG. 4 is a flowchart identifying functions included in a range estimation functional model of a FMCW radar system retrofitted to enable pulsed mode operation in accordance with one embodiment.

FIG. 4 is a flowchart identifying functions included in a range estimation functional model 100 of a FMCW radar system retrofitted to enable pulsed mode operation in accordance with one embodiment. A range estimation module in the DSP 16 receives the radar returns in the form of baseband signals from the ADCs 12 (step 102). The range estimation module also receives inertial data from an inertial measurement unit (not shown in the drawings) of the mobile radar platform (step 104). Using the baseband signals and inertial data, the range estimation module in DSP 16 detects and estimates the ranges of potential targets in the scene (step 106). Once the range of each detected target has been estimated, the estimated range is reported to the microcontroller 14 (step 108). A mode selection module of the microcontroller 14 then selects the mode of operation based on the estimated range of the target of interest (step 110) as previously described with reference to FIG. 2. The mode of operation is then set within the microcontroller 14 (step 112). The microcontroller 14 selects a sweep time (step 114) and then sets the sweep time of the local oscillator 18 (step 116). In addition, the microcontroller 14 selects a sweep bandwidth (step 118) and then sets the sweep bandwidth of the local oscillator 18 (step 120). Also, the microcontroller 14 selects a transmit power (step 122) and then sets the attenuation level of the variable attenuator 34 (step 124).

Figure 4A:
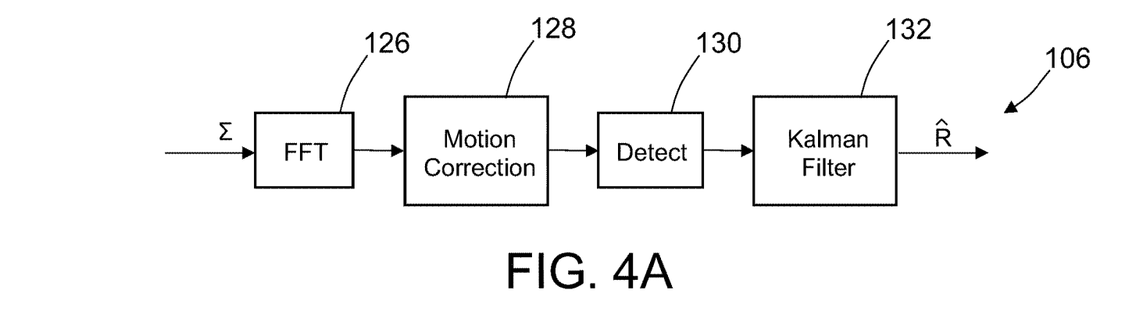
FIG. 4A is a flowchart identifying steps performed as part of the range estimation function identified in FIG. 4 in accordance with one proposed implementation.

FIG. 4A is a flowchart identifying steps performed as part of the range estimation function (step 106) identified in FIG. 4 in accordance with one proposed implementation. First, baseband data from each sweep in the measurement frame, which may consist of one or many sweeps, are compiled into a matrix $\Sigma$, where one axis of the matrix is comprised of the time domain samples collected from each sweep and the other axis is comprised of the number of sweeps in a frame. To convert this data into range and velocity of the target, a two-dimensional fast Fourier transform 126 is performed on matrix Σ, such that the time axis is now converted to range and the sweep number axis is converted to velocity.

In scenarios where the radar system is deployed on a moving platform and/or where targets of interest in the environment are moving or assumed to be moving, motion correction (compensation) can be applied to this data (step 128). The motion correction process assumes that the motion of the platform and target are known or can be estimated from inertial data with reasonable accuracy. Using this information about the relative motion of the platform and target, appropriate phase shifts in the baseband time domain data or time delays in the range data can be applied for each sweep. Once corrected, these sweeps can be integrated to allow for improved signal-to-noise ratio and range accuracy.

Following motion correction and/or sweep integration, targets in the range response are detected using well-known techniques (step 130). One such technique is constant false alarm rate (CFAR) detection. The CFAR detection algorithm is a digital signal process by which a target is declared present or absent in the cell under test, while maintaining a constant false alarm rate. To achieve this, the detectors use an adaptive threshold for deciding whether a target is present or not. Although various implementations of CFAR detection algorithms exist, most work by comparing each point in the range return to its neighboring range cells under certain criteria designed to maintain a given false alarm rate and probability of detection. In the detection and tracking framework shown here it is assumed that there is only one large target in the environment. Therefore, when the criteria is met for detection, the range of the detected target is then passed to a Kalman filter 132 for tracking. For scenarios where multiple targets exist in the environment, more advanced target identification methods are required to determine which target or targets to track.

The Kalman filter 132 can be implemented using a variety of well-known algorithms which, in general, seek to maintain a probability distribution over range which is then updated for each detected target range. This Kalman filter algorithm then provides estimated target ranges $\hat{R}$ as inputs to the mode selection module (step 110 in FIG. 4).

Figures 5, 5A:
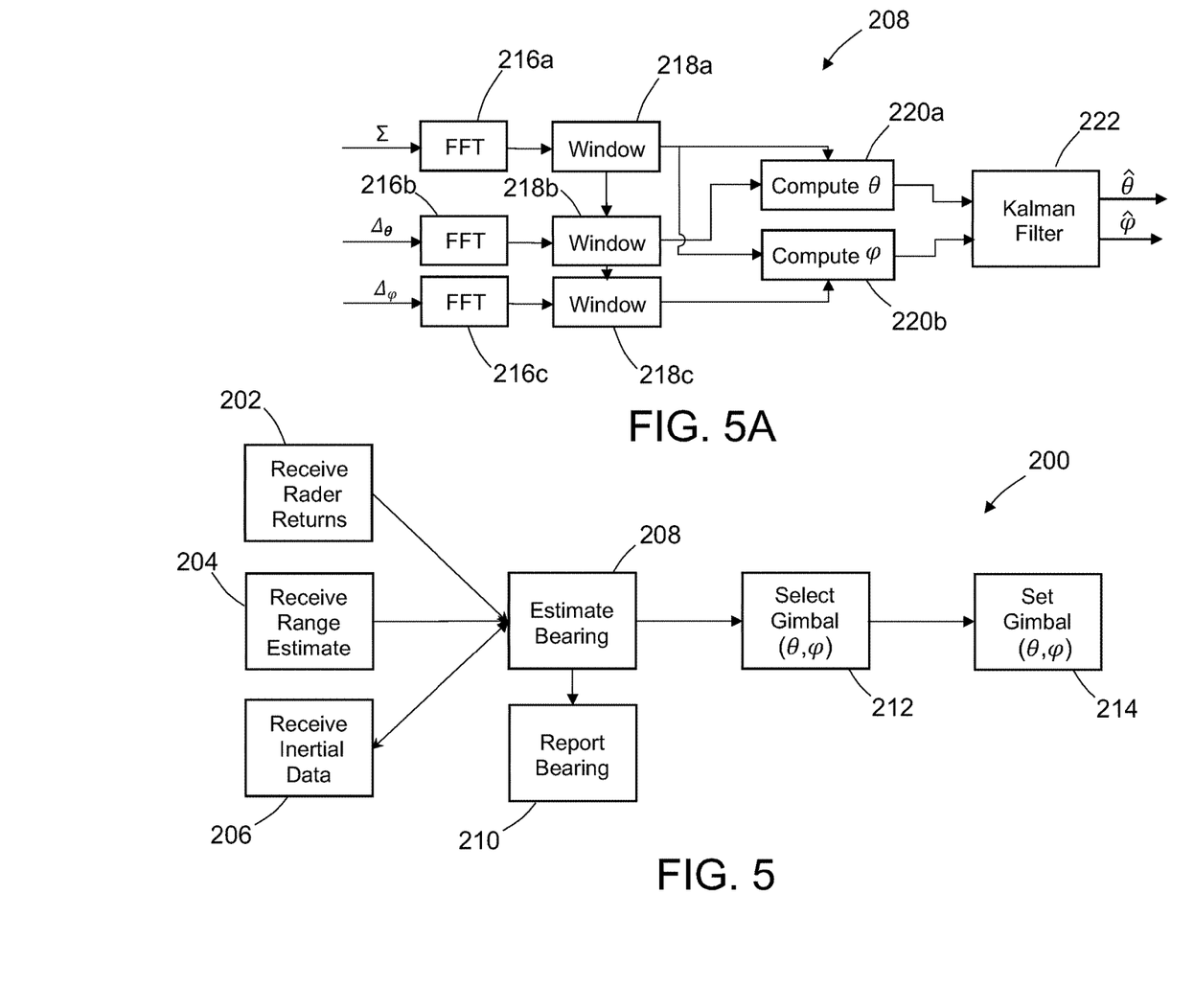
FIG. 5 is a flowchart identifying functions included in a bearing estimation functional model of a FMCW radar system retrofitted to enable pulsed mode operation in accordance with one embodiment.
FIG. 5A is a flowchart identifying steps performed as part of the bearing estimation function identified in FIG. 5 in accordance with one proposed implementation.

FIG. 5 is a flowchart identifying functions included in a bearing estimation functional model 200 of a FMCW radar system retrofitted to enable pulsed mode operation in accordance with one embodiment. A bearing estimation module in the DSP 16 receives the radar returns in the form of baseband signals from the ADCs 12 (step 202). In addition, the bearing estimation module receives the estimated ranges from the range estimation module (step 204). The bearing estimation module also receives inertial data from the inertial measurement unit of the mobile radar platform (step 206). Using the baseband signals, estimated ranges, and inertial data, the bearing estimation module in DSP 16 estimates the bearing of detected targets in the scene (step 208). Once the bearing of each detected target has been estimated, the estimated bearing is reported to the microcontroller 14 (step 210). The microcontroller 14 selects the elevation (θ) and azimuth (φ) angles of the gimbal on which the radar platform is mounted based on the estimated target elevation angle $\hat{\theta}$ and estimated target azimuth angle $\hat{\varphi}$ (step 212). Then the microcontroller 14 issues commands to set the orientation of the gimbal to the selected elevation and azimuth angles (step 214).

FIG. 5A is a flowchart identifying steps performed as part of the bearing estimation function (step 208) identified in FIG. 5 in accordance with one proposed implementation. First, it is assumed that the receive antennas for radar are arranged in a 2×2 monopulse configuration. In this configuration, three distinct signal values are computed from the four measured signals at each receive port: (1) a sum or Σ value, which is computed as the linear summation of all four signals; (2) a delta elevation or $\Delta_\theta$ value, which is computed as the linear difference between antenna pairs configured vertically; and (3) a delta azimuth or $\Delta_\varphi$ value, which is computed as the linear difference between antenna pairs configured horizontally.

Once the Σ, $\Delta_\theta$, and $\Delta_\varphi$ values have been computed, the fast Fourier transform (FFT) of each of these values is computed, as indicated by FFTs 216*a*-216*c* in FIG. 4A. The FFT sample values within respective windows 218*a*-218*c* of time are used to compute the bearing in elevation and azimuth. The starting and ending times of each window correspond to the respective end points of the estimated range of the target. The elevation and azimuth are computed in steps 220*a* and 22*b* using the corresponding samples from the sum and difference signals at the locations corresponding to the estimated range of the target using the following equation:

$$\angle_{\theta,\varphi} = \sin^{-1}\left(\frac{2\tan^{-1}\left(\frac{\Delta_{\theta,\varphi}}{\Sigma}\right)}{kd}\right),$$

where $\angle_{\theta,\varphi}$ is the estimated bearing in elevation or azimuth, k is the wave-number equal to $2\pi/\lambda$, where λ is the free space wavelength, and d is the distance between the antenna pair. Once computed, this bearing estimation is provided to a Kalman filter 222, which can be implemented using a variety of well-known algorithms that seek to maintain a probability distribution over bearing, which is then updated for each detected target bearing. The Kalman filter algorithm then provides estimated target elevation ($\hat{\theta}$) and estimated target azimuth ($\hat{\varphi}$) to the module which selects the gimbal state (step 212 in FIG. 4).

Figure 6A:
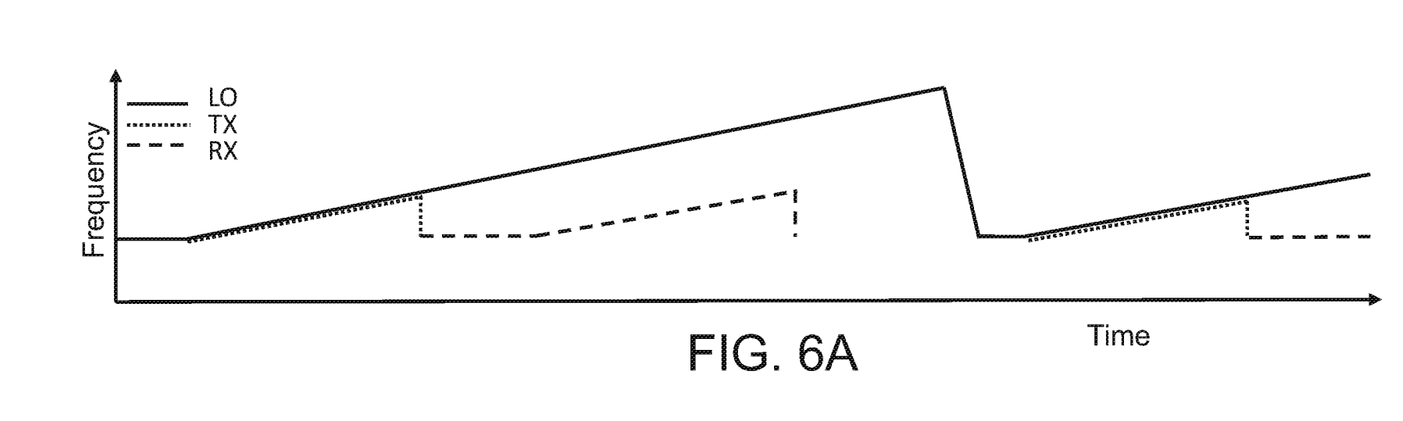
FIG. 6A is a diagram showing a frequency versus time graph for the search mode of operation for a radar system in accordance with one embodiment.

FIG. 6A is a diagram showing a frequency versus time graph for the search mode of operation for a radar system in accordance with one embodiment. The solid lines represent the linear frequency-modulated sweep signal (up chirp) output by the local oscillator 18. The dotted lines represent the portion of the up chirp which is transmitted during a transmit cycle. The dashed lines represent the up chirp which is returned during a receive cycle. As seen in FIG. 6A, the search mode includes one sequence of a transmit cycle followed by a receive cycle during each sweep cycle.

Figure 6B:
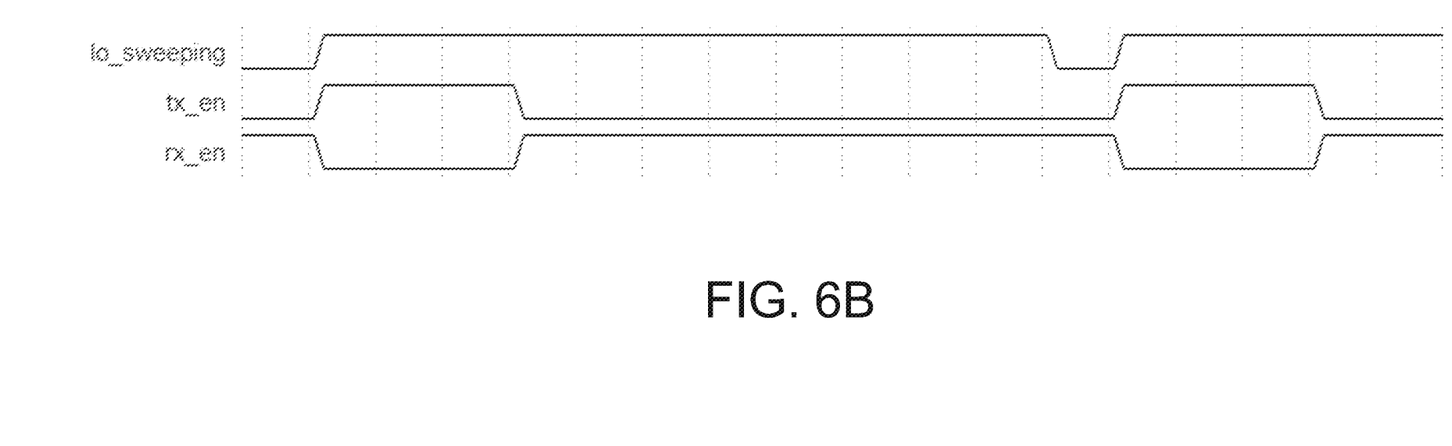
FIG. 6B is a signal timing diagram for the search mode in accordance with one proposed implementation.

FIG. 6B is a signal timing diagram for the signals depicted in FIG. 6A. The lo_sweeping sweep control signal output by microcontroller 14 to transmitter 6 controls the timing of the linear frequency-modulated sweep signal output by local oscillator 18. When the lo_sweeping sweep control signal goes high, the local oscillator 18 starts to sweep and continues to sweep until the lo_sweeping sweep control signal goes low. The local oscillator 18 stops sweeping when the lo_sweeping sweep control signal goes low.

Referring to FIG. 6B, the tx_en switch control signal output by microcontroller 14 controls the switching state of transmit switch 32. The tx_en switch control signal goes high (transmit switch 32 closes) at the same when the lo_sweeping sweep control signal goes high, but then the tx_en switch control signal goes low (transmit switch 32 opens) before the lo_sweeping sweep control signal goes low. The linear frequency-modulated sweep signal output by the local oscillator 18 passes through the transmit switch 32 and to the antenna only when the tx_en switch control signal is high.

Still referring to FIG. 6B, the rx_en switch control signal output by microcontroller 14 controls the switching state of receive switches 46. The rx_en switch control signal goes low (receive switch 32 opens) when the tx_en switch control signal goes high (transmit switch 32 closes). The rx_en switch control signal goes high (receive switch 32 closes) when the tx_en switch control signal goes low (transmit switch 32 opens).

As seen in FIG. 6B, the rx_en switch control signal is low when the tx_en switch control signal is high; the tx_en switch control signal is low when the rx_en switch control signal is high. Thus, the receive switches 46 are open when the transmit switch 32 is closed and vice versa. The return signals pass through the receive switch 46 and to the receiver 8 only when the rx_en switch control signal is high.

The return signals pass through the receive switch 46 and to the receiver 8 only when the rx_en switch control signal is high. Thus, the receive switches 46 are open when the transmit switch 32 is closed and vice versa.

Figure 7A:
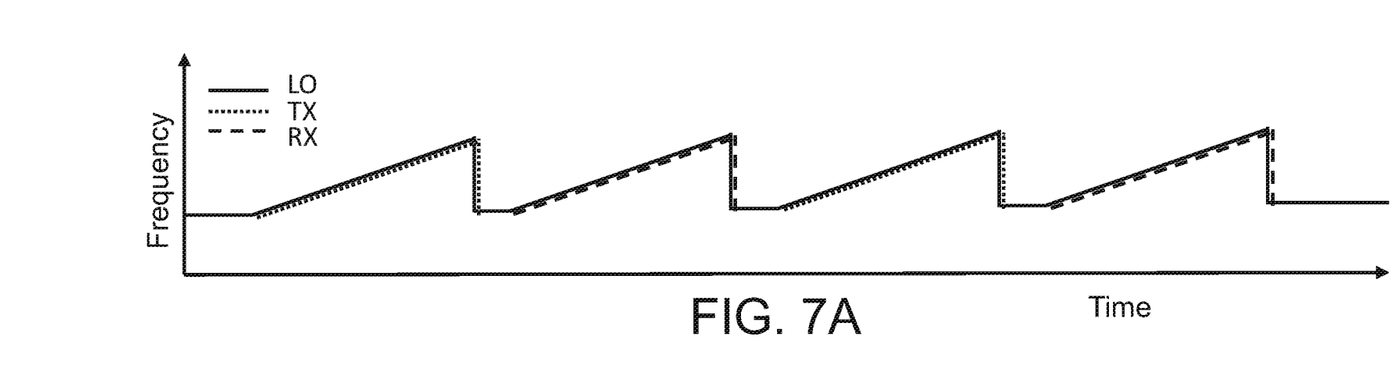
FIG. 7A is a diagram showing a frequency versus time graph for the tracking mode of operation for a radar system in accordance with one embodiment.

FIG. 7A is a diagram showing a frequency versus time graph for the tracking mode of operation for a radar system in accordance with one embodiment. The solid lines represent linear frequency sweep signals (up chirps) output by the local oscillator 18. The dotted lines represent the up chirps which are transmitted during the transmit cycles. The dashed lines represent the up chirps which are returned during the receive cycles. As seen in FIG. 7A, the tracking mode includes alternating transmit and receive cycles, the transmissions being synchronized with the odd-numbered (e.g., first, third, etc.) sweep cycles and the receptions being synchronized with the even-numbered (e.g., second, fourth, etc.) sweep cycles of local oscillator 18.

Figure 7B:
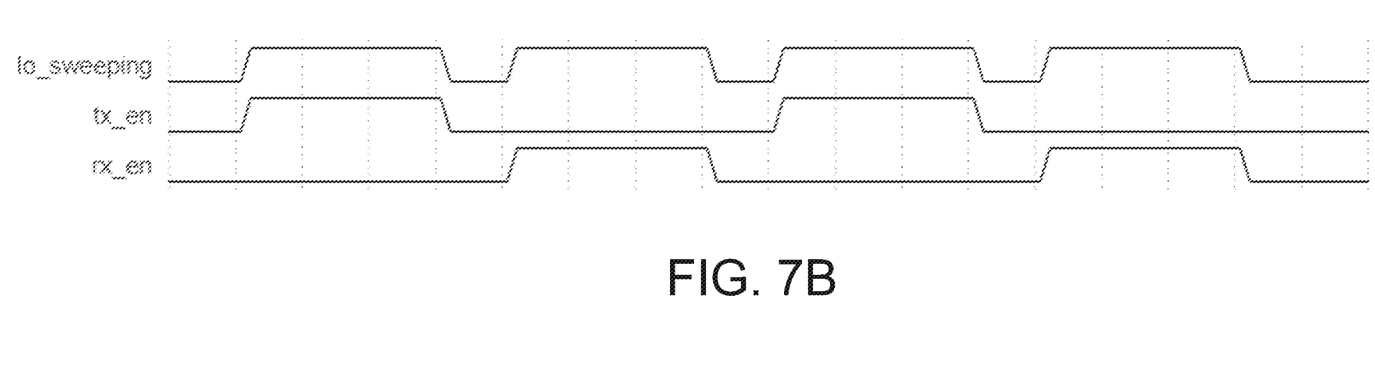
FIG. 7B is a signal timing diagram for the tracking mode in accordance with one proposed implementation.

FIG. 7B is a signal timing diagram for the signals depicted in FIG. 7A. The lo_sweeping sweep control signal output by microcontroller 14 to transmitter 6 controls the timing of the linear frequency-modulated sweep signal output by local oscillator 18 as previously described. The tx_en switch control signal output by microcontroller 14 controls the switching state of transmit switch 32 as previously described. In the tracking mode, the tx_en switch control signals go high (transmit switch 32 closes) at the same times when the odd-numbered lo_sweeping sweep control signals go high; the tx_en switch control signals go low (transmit switch 32 opens) when the odd-numbered lo_sweeping sweep control signal go low. During the even-numbered lo_sweeping sweep control signals, the tx_en switch control signals remain low (transmit switch 32 open). The high tx_en switch control signals are timed so that every other linear frequency-modulated sweep signal output by the local oscillator 18 is transmitted.

Still referring to FIG. 7B, the rx_en switch control signal output by microcontroller 14 controls the switching state of receive switches 46 as previously described. In the tracking mode, the rx_en switch control signals go high (receive switches 46 close) at the same times when the even-numbered lo_sweeping sweep control signals go high; the rx_en switch control signals go low (receive switches 46 open) when the even-numbered lo_sweeping sweep control signal go low. During the odd-numbered lo_sweeping sweep control signal, the rx_en switch control signals remain low (receive switches 46 open). When the lo_sweeping sweep control signal is low, the transmit switch 32 and the receive switches 46 are both closed.

As seen in FIG. 7B, whenever the rx_en switch control signal is high, the tx_en switch control signal is low. Conversely, whenever the tx_en switch control signal is high, the rx_en switch control signal is low. Thus, the receive switches 46 and the transmit switch 32 are never closed at the same time. The transmit signals pass through the transmit switch 32 to the antenna only when the transmit switch 32 is closed; the return signals pass through the receive switches 46 and to the receiver 8 only when the receive switches 46 are closed.

Figure 8A:
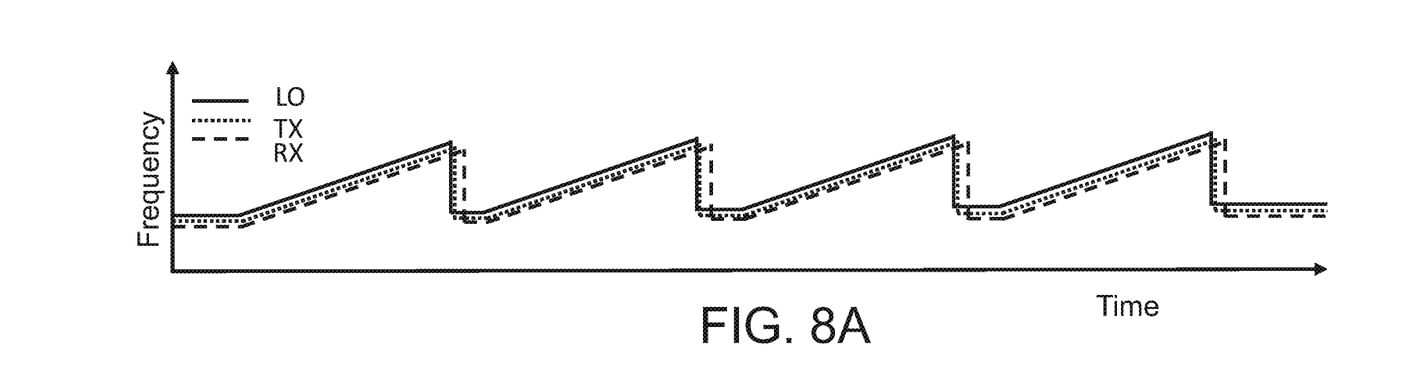
FIG. 8A is a diagram showing a frequency versus time graph for the FMCW mode of operation for a radar system in accordance with one embodiment.

FIG. 8A is a diagram showing a frequency versus time graph for the FMCW mode of operation for a radar system in accordance with one embodiment. The solid lines represent linear frequency sweep signals (up chirps) output by the local oscillator 18. The dotted lines represent the up chirps which are transmitted during the transmit cycles. The dashed lines represent the up chirps which are returned during the receive cycles. As seen in FIG. 8A, all of the linear frequency-modulated signals output by the local oscillator 18 are transmitted and all of the radar return signals are received with a small delay.

Figure 8B:
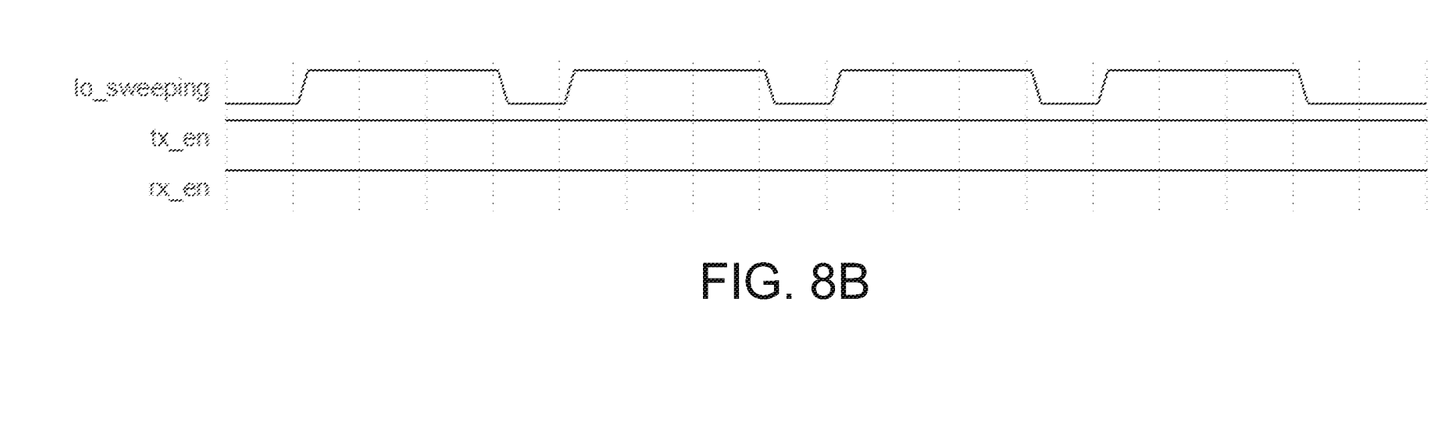
FIG. 8B is a signal timing diagram for the FMCW mode in accordance with one proposed implementation.

FIG. 8B is a signal timing diagram for the signals depicted in FIG. 8A. The lo_sweeping sweep control signal output by microcontroller 14 to transmitter 6 controls the timing of the linear frequency-modulated sweep signal output by local oscillator 18 as previously described. The tx_en switch control signal output by microcontroller 14 controls the switching state of transmit switch 32 as previously described. The rx_en switch control signal output by microcontroller 14 controls the switching state of receive switches 46 as previously described.

As seen in FIG. 8B, in the FMCW mode the tx_en and rx_en switch control signals are always high, meaning that the transmit switch 32 and receive switches 46 are continuously closed. In the FMCW mode, the gain on the amplifiers is reduced to prevent damage to sensitive front-end components. The FMCW mode is activated once the estimated range of the target is sufficiently low such that the radar can detect the target without operating the external power amplifiers 40 at full power.

In accordance with one embodiment of a method for operating the retrofitted radar system, the radar system starts in the pulsed search mode and then progresses to either the pulsed tracking mode of the FMCW mode. In a typical scan sequence, the radar system starts in the pulsed search mode, transitions to the pulsed tracking mode, and then transitions to the FMCW mode. In the pulsed search mode, the local oscillator 18 is controlled to generate successive linear frequency-modulated sweep signals and the switching states of the transmit switch 32 and receive switches 46 are controlled so that the transmit switch 32 is open when the receive switches 46 are closed and the transmit switch 32 is closed when the receive switches 46 are open during each linear frequency-modulated sweep signal. In the pulsed tracking mode, the local oscillator 18 is controlled to generate successive odd- and even-numbered linear frequency-modulated sweep signals and the switching states of the transmit switch 32 and receive switches 46 are controlled so that the transmit switch 32 is closed and the receive switches 46 are open during generation of the odd-numbered linear frequency-modulated sweep signals and so that the transmit switch 32 is open and the receive switches 46 are closed during generation of the even-numbered linear frequency-modulated sweep signals. In the FMCW mode, the local oscillator 18 is controlled to generate successive linear frequency-modulated sweep signals and the switching states of the transmit switch 32 and receive switches 46 are controlled so that the transmit and receive switches remain closed and are not opened during generation of the linear frequency-modulated sweep signals.

Figure 9:
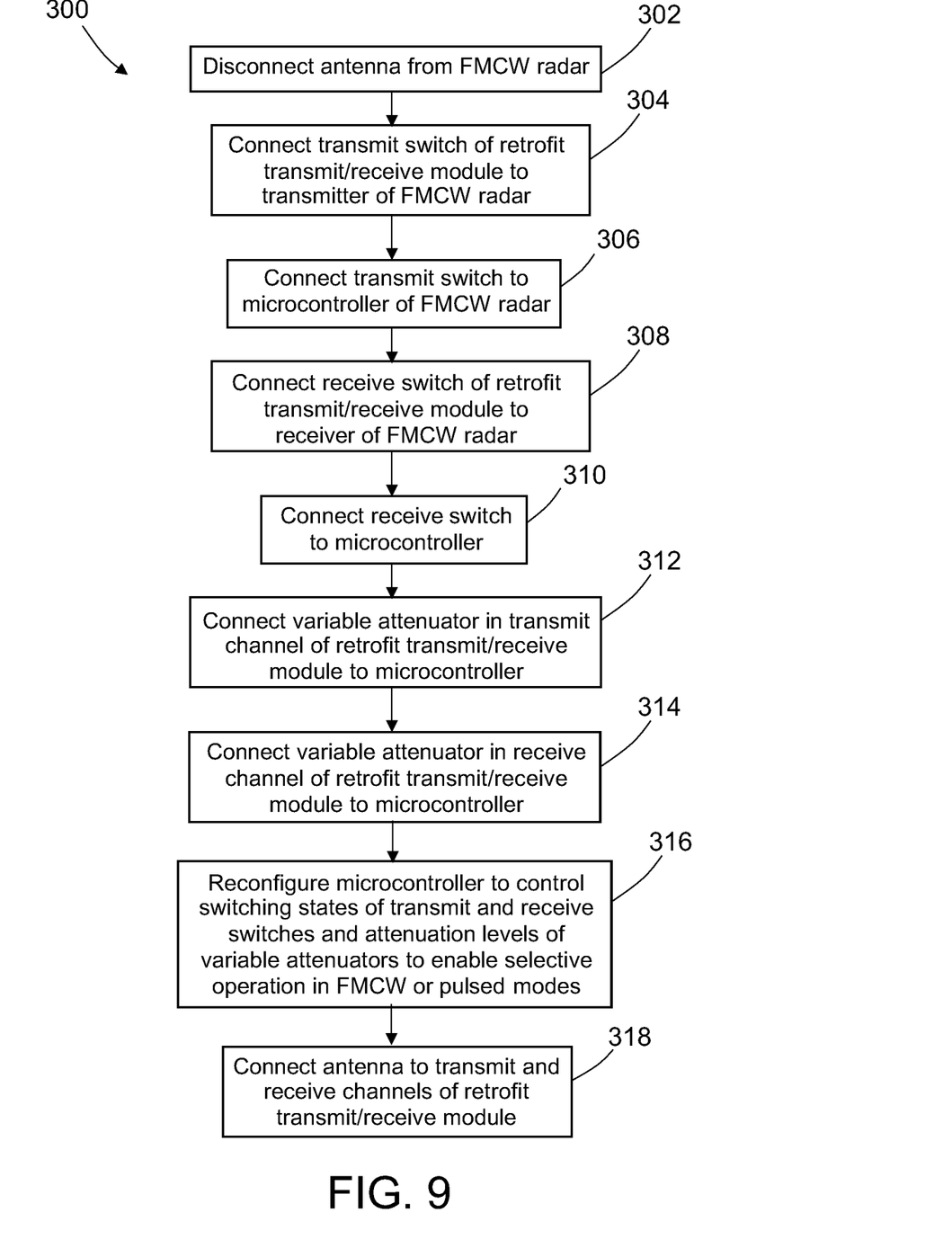
FIG. 9 is a flowchart identifying steps of a method 300 for retrofitting an FMCW radar system to also be capable of operating in either of two pulsed modes.

FIG. 9 is a flowchart identifying steps of a method 300 for retrofitting an FMCW radar system 10 to also be capable of operating in either of two pulsed modes. First, the antenna 50 is disconnected from the FMCW radar system 10 (step 302). Then a retrofit transmit/receive module 30 is connected to the FMCW radar system 10. The connection of the retrofit transmit/receive module 30 to the FMCW radar system 10 includes the following steps: connecting transmit switch 32 in transmit channel 26 of retrofit transmit/receive module 30 to transmitter 6 of the FMCW radar system 10 (step 304); connecting transmit switch 32 to microcontroller 14 of the FMCW radar system 10 (step 306); connecting receive switches 46 in receive channel 28 of retrofit transmit/receive module 30 to receiver 8 of the FMCW radar system 10 (step 308); connecting receive switches 46 to microcontroller 14 (step 310); connecting variable attenuator 34 in transmit channel 26 to microcontroller 14 (step 312); and connecting variable attenuators 44 in receive channel 28 to microcontroller 14 (step 314). Although FIG. 9 shows steps 302 through 314 being performed in numerical order, this is but one example. In practice, steps 302 through 314 may be performed in any order.

In addition, the retrofitting method 300 includes the step of reconfiguring the microcontroller to control the switching states of the transmit and receive switches and control the attenuation levels of the variable attenuators to enable selective operation in an FMCW mode or in either the pulsed search mode or the pulsed tracking mode. Although FIG. 9 shows step 316 being performed after steps 302 through 314, this is but one example. In practice, step 316 may be performed at any time, including before the antenna 50 is disconnected from the FMCW radar system 10 in step 302 or after the antenna 50 is connected to the retrofit transmit/receive module 30 in step 318. In step 318, the antenna 50 is connected to the transmit and receive channels of the retrofit transmit/receive module 30.

More specifically, the microcontroller is reconfigured to control the transmitter in the pulsed search mode to generate successive linear frequency-modulated sweep signals and control the switching states of the transmit switch and first receive switch so that the transmit switch is open when the first receive switch is closed and the transmit switch is closed when the first receive switch is open during each linear frequency-modulated sweep signal. In addition, the microcontroller is reconfigured to control the transmitter in the pulsed tracking mode to generate successive odd- and even-numbered linear frequency-modulated sweep signals and control the switching states of the transmit switch and the first receive switch so that the transmit switch is closed and the first receive switch is open during generation of the odd-numbered linear frequency-modulated sweep signals and so that the transmit switch is open and the first receive switch is closed during generation of the even-numbered linear frequency-modulated sweep signals. Lastly, the microcontroller is further configured to control the transmitter in the FMCW mode to generate successive linear frequency-modulated sweep signals and control the switching states of the transmit switch and first receive switch so that the transmit switch and first receive switch are closed during generation of the linear frequency-modulated sweep signals.

Certain systems, apparatus, applications or processes have been described herein as including a number of modules. A module may be a unit of distinct functionality that may be implemented in software, hardware, or combinations thereof, except for those modules which are preferably implemented as hardware or firmware to enable streaming calculations as disclosed herein. When the functionality of a module is performed in any part through software, the module can include a non-transitory tangible computer-readable storage medium.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

While pulsed linear frequency-modulated radar systems having the capability to dynamically switch between two pulsed modes and an FMCW mode based on the estimated range of a target have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

The controllers and processors disclosed herein may be implemented using hardware or hardware in combination with software. For example, a controller or control module may be implemented using configurable hardware, a programmable device, or both. Configurable hardware may comprise hardware that is configurable to perform one or more functions disclosed herein. A programmable device may comprise any device that is programmable to implement one or more functions disclosed herein. The programmable device may be configured to run software or firmware in the form of program instructions to implement one or more functions. Program instructions may be stored in any appropriate non-transitory tangible computer-readable storage medium for execution by, or transfer to, the programmable device.

The methods described and claimed herein may include steps encoded as executable instructions embodied in a non-transitory tangible computer-readable storage medium, including, without limitation, a storage device and/or a memory device. Such instructions, when executed by a processing or computing system, cause the system device to perform at least a portion of the methods described herein.

In the method claims appended hereto, any alphabetic ordering of steps is for the sole purpose of enabling subsequent short-hand references to antecedent steps and not for the purpose of limiting the scope of the claim to require that the method steps be performed in alphabetic order. Also, the terms "first time period", "second time period", and "third time period" use the modifiers first, second, and third merely to reflect the order in which the time periods are recited in the claims, not to indicate the order in which the time periods occur in the temporal domain.

The invention claimed is:

1. A method for retrofitting a frequency modulation continuous wave (FMCW) radar system, the method comprising:
   (a) disconnecting an antenna from the FMCW radar system;

(b) connecting a retrofit transmit/receive module to the FMCW radar system; and (c) connecting the antenna to the retrofit transmit/receive module, wherein step (b) comprises:

connecting a transmit switch in a transmit channel of the retrofit transmit/receive module to a transmitter of the FMCW radar system;

connecting the transmit switch to a microcontroller of the FMCW radar system;

connecting a receive switch in a receive channel of the retrofit transmit/receive module to a receiver of the FMCW radar system; and connecting the receive switch to the microcontroller, and wherein the method further comprises reconfiguring the microcontroller from a first configuration in which the microcontroller is able to operate in a FMCW mode but not in a pulsed mode to a second configuration in which the microcontroller is able to selectively operate in either the FMCW mode or the pulsed mode by controlling switching states of the transmit and receive switches.

2. The method as recited in claim 1, wherein step (c) comprises connecting the antenna to the transmit and receive channels of the retrofit transmit/receive module.

3. The method as recited in claim 1, wherein step (b) further comprises:

connecting a variable attenuator in the transmit channel of the retrofit transmit/receive module to the microcontroller and connecting a variable attenuator in the receive channel of the retrofit transmit/receive module to the microcontroller.

4. A method for retrofitting a frequency modulation continuous wave (FMCW) radar system, the method comprising:

(a) disconnecting an antenna from the FMCW radar system;

(b) connecting a retrofit transmit/receive module to the FMCW radar system; and (c) connecting the antenna to the retrofit transmit/receive module, wherein step (b) comprises:

connecting a transmit switch in a transmit channel of the retrofit transmit/receive module to a transmitter of the FMCW radar system;

connecting the transmit switch to a microcontroller of the FMCW radar system;

connecting a receive switch in a receive channel of the retrofit transmit/receive module to a receiver of the FMCW radar system;

connecting the receive switch to the microcontroller;

connecting a variable attenuator in the transmit channel of the retrofit transmit/receive module to the microcontroller; and connecting a variable attenuator in the receive channel of the retrofit transmit/receive module to the microcontroller, and wherein the method further comprises reconfiguring the microcontroller to control switching states of the transmit and receive switches and control attenuation levels of the variable attenuators to enable selective operation in an FMCW mode or in either of first and second pulsed modes.

5. The method as recited in claim 4, wherein the first pulsed mode is a search mode that is capable of detecting targets at long range, the second pulsed mode is a tracking mode that is capable of detecting targets at mid-range, and the FMCW mode that is capable of detecting targets at short range.

6. The method as recited in claim 5, wherein the search mode is capable of detecting targets at a range greater than 10 kilometers, the tracking mode is capable of detecting targets at a range from a few to less than 10 kilometers, and the FMCW mode is capable of detecting targets at a range less than a few kilometers.

7. The method as recited in claim 4, wherein step (c) comprises connecting the antenna to the transmit and receive channels of the retrofit transmit/receive module.

8. A radar system comprising a FMCW radar system, a retrofit transmit/receive module connected to the FMCW radar system, and an antenna connected to the retrofit transmit/receive module, wherein:

the FMCW radar system comprises a transmitter, a receiver connected to the transmitter, analog-to-digital converters connected to the receiver, a digital signal processor connected to the analog-to-digital converters, and a microcontroller connected to the digital signal processor and to the transmitter;

the retrofit transmit/receive module comprises a transmit channel and a receive channel;

the transmit channel comprises a transmit switch that is connected to the transmitter and to the microcontroller; and the receive channel comprises a first receive switch that is connected to the receiver and to the microcontroller, wherein the microcontroller is further configured to:

control switching states of the transmit switch and the first receive switch to enable selective operation in an FMCW mode or in either of a pulsed search mode or pulsed tracking mode; and control the transmitter in the pulsed search mode to generate successive linear frequency-modulated sweep signals and control the switching states of the transmit switch and first receive switch so that the transmit switch is open when the first receive switch is closed and the transmit switch is closed when the first receive switch is open during each linear frequency-modulated sweep signal.

9. The radar system as recited in claim 8, wherein the receive channel comprises a second receive switch that is connected to the receiver and to the microcontroller.

10. The radar system as recited in claim 8, wherein the microcontroller is further configured to control transmitter in the pulsed tracking mode to generate successive odd- and even-numbered linear frequency-modulated sweep signals and control the switching states of the transmit switch and the first receive switch so that the transmit switch is closed and the first receive switch is open during generation of the odd-numbered linear frequency-modulated sweep signals and so that the transmit switch is open and the first receive switch is closed during generation of the even-numbered linear frequency-modulated sweep signals.

11. The radar system as recited in claim 10, wherein the microcontroller is further configured to control the transmitter in the FMCW mode to generate successive linear frequency-modulated sweep signals and control the switching states of the transmit switch and first receive switch so that the transmit switch and first receive switch remain closed and are not opened during generation of the linear frequency-modulated sweep signals.

12. The radar system as recited in claim 8, wherein the transmit channel further comprises a first variable attenuator connected to the transmit switch and to the microcontroller.

13. The radar system as recited in claim 12, wherein the receive channel further comprises a second variable attenuator connected to the receive switch and to the microcontroller.

14. A radar system comprising a FMCW radar system, a retrofit transmit/receive module connected to the FMCW radar system, and an antenna connected to the retrofit transmit/receive module, wherein:
the FMCW radar system comprises a transmitter, a receiver connected to the transmitter, analog-to-digital converters connected to the receiver, a digital signal processor connected to the analog-to-digital converters, and a microcontroller connected to the digital signal processor and to the transmitter;
the retrofit transmit/receive module comprises a transmit channel and a receive channel;
the transmit channel comprises a transmit switch that is connected to the transmitter and to the microcontroller; and
the receive channel comprises a first receive switch that is connected to the receiver and to the microcontroller,
wherein the transmit channel further comprises a first variable attenuator connected to the transmit switch and to the microcontroller;
wherein the receive channel further comprises a second variable attenuator connected to the receive switch and to the microcontroller; and
wherein the microcontroller is further configured to control attenuation levels of the first and second variable attenuators to enable selective operation in the FMCW mode or in either of the pulsed search mode or pulsed tracking mode.

15. The radar system as recited in claim 13, wherein the microcontroller is further configured to control attenuation levels of the first and second variable attenuators to enable selective operation in the FMCW mode or in either of the pulsed search mode or pulsed tracking mode.

16. A method for operating a radar system having a transmitter connected to a retrofitted transmit/receive module, the method comprising:
controlling a local oscillator of the transmitter to output linear frequency-modulated sweep signals, controlling switching states of transmit and receive switches of transmit and receive channels respectively of the retrofitted transmit/receive module, and controlling attenuation levels of first and second variable attenuators of the transmit and receive channels respectively SO that the radar system operates in a pulsed search mode during a first time period;
controlling the local oscillator to output linear frequency-modulated sweep signals, controlling the switching states of the transmit and receive switches, and controlling the attenuation levels of the first and second variable attenuators so that the radar system operates in a pulsed tracking mode during a second time period subsequent to the first time period; and
controlling the local oscillator to output linear frequency-modulated sweep signals, controlling the switching states of the transmit and receive switches, and controlling the attenuation levels of the first and second variable attenuators so that the radar system operates in an FMCW mode during a third time period subsequent to the first time period,
wherein the radar system is capable of detecting targets at long range when operating in the pulsed search mode, detecting targets at mid-range when operating in the pulsed tracking mode, and detecting targets at short range when operating in the FMCW mode.

17. The method as recited in claim 16, wherein the radar system is capable of detecting targets at a range greater than 10 kilometers when operating in the pulsed search mode, detecting targets at a range from a few to less than 10 kilometers when operating in the pulsed tracking mode, and detecting targets at a range less than a few kilometers when operating in the FMCW mode.

18. The method as recited in claim 16, wherein the local oscillator is controlled in the pulsed search mode to generate successive linear frequency-modulated sweep signals and the switching states of the transmit and receive switches are controlled so that the transmit switch is open when the receive switch is closed and the transmit switch is closed when the receive switch is open during each linear frequency-modulated sweep signal.

19. The method as recited in claim 18, wherein the local oscillator is controlled in the pulsed tracking mode to generate successive odd- and even-numbered linear frequency-modulated sweep signals and the switching states of the transmit and receive switches are controlled so that the transmit switch is closed and the receive switch is open during generation of the odd-numbered linear frequency-modulated sweep signals and so that the transmit switch is open and the receive switch is closed during generation of the even-numbered linear frequency-modulated sweep signals.

20. The method as recited in claim 19, wherein the local oscillator is controlled in the FMCW mode to generate successive linear frequency-modulated sweep signals and the switching states of the transmit and receive switches are controlled so that the transmit and receive switches remain closed and are not opened during generation of the linear frequency-modulated sweep signals.

* * * * *